United States Patent [19]

Jacob et al.

[11] 4,030,735
[45] June 21, 1977

[54] BUMPER ARRANGEMENT AND CONNECTION

[75] Inventors: Friedrich Jacob, Steimke; Gerhard Voigt, Wolfsburg; Freidhelm Frank, Fallersleben, all of Germany

[73] Assignee: Volkswagenwerk Aktiengesellschaft, Wolfsburg, Germany

[22] Filed: Dec. 2, 1975

[21] Appl. No.: 636,987

[30] Foreign Application Priority Data

Dec. 6, 1974  Germany .......................... 2457676

[52] U.S. Cl. .................. 293/71 R; 293/99; 267/140; 29/428; 29/526
[51] Int. Cl.² ......................................... B60R 19/08
[58] Field of Search .................. 293/71 R, 71 P, 98, 293/96, 99, 89, 88, 1; 267/139–140; 114/219; 403/363; 29/428, 526; 52/716–718

[56] References Cited

UNITED STATES PATENTS

| 2,188,082 | 1/1940 | Imhofe | 293/71 R |
| 3,425,587 | 2/1969 | Duross, Jr. | 29/428 X |
| 3,825,229 | 7/1974 | Bartlett et al. | 52/716 X |
| 3,843,182 | 10/1974 | Walls et al. | 293/88 |
| 3,857,595 | 12/1974 | Plegat | 293/71 R |

FOREIGN PATENTS OR APPLICATIONS

| 1,464,260 | 11/1966 | France | 52/718 |
| 2,360,525 | 6/1974 | Germany | 293/71 P |
| 2,115,262 | 10/1972 | Germany | 293/98 |

Primary Examiner—Robert B. Reeves
Assistant Examiner—Charles A. Marmor
Attorney, Agent, or Firm—Brumbaugh, Graves, Donohue & Raymond

[57] ABSTRACT

A bumper for an object to be protected, e.g. an automobile, has a closed profiled-section support beam comprised of a rigid rear support and a front hollow section of some deformable material. The front section partly embraces the rigid support with freely extending parallel shanks that are separably connected with the rigid support by screw connections for the bottom shank and hook-shaped holding elements for the upper shank. The front section also contains reinforcing ribs with edges arranged at a distance opposite a front portion of the rigid support means. The lower shank has a region that bears against a portion of the rigid support.

4 Claims, 2 Drawing Figures

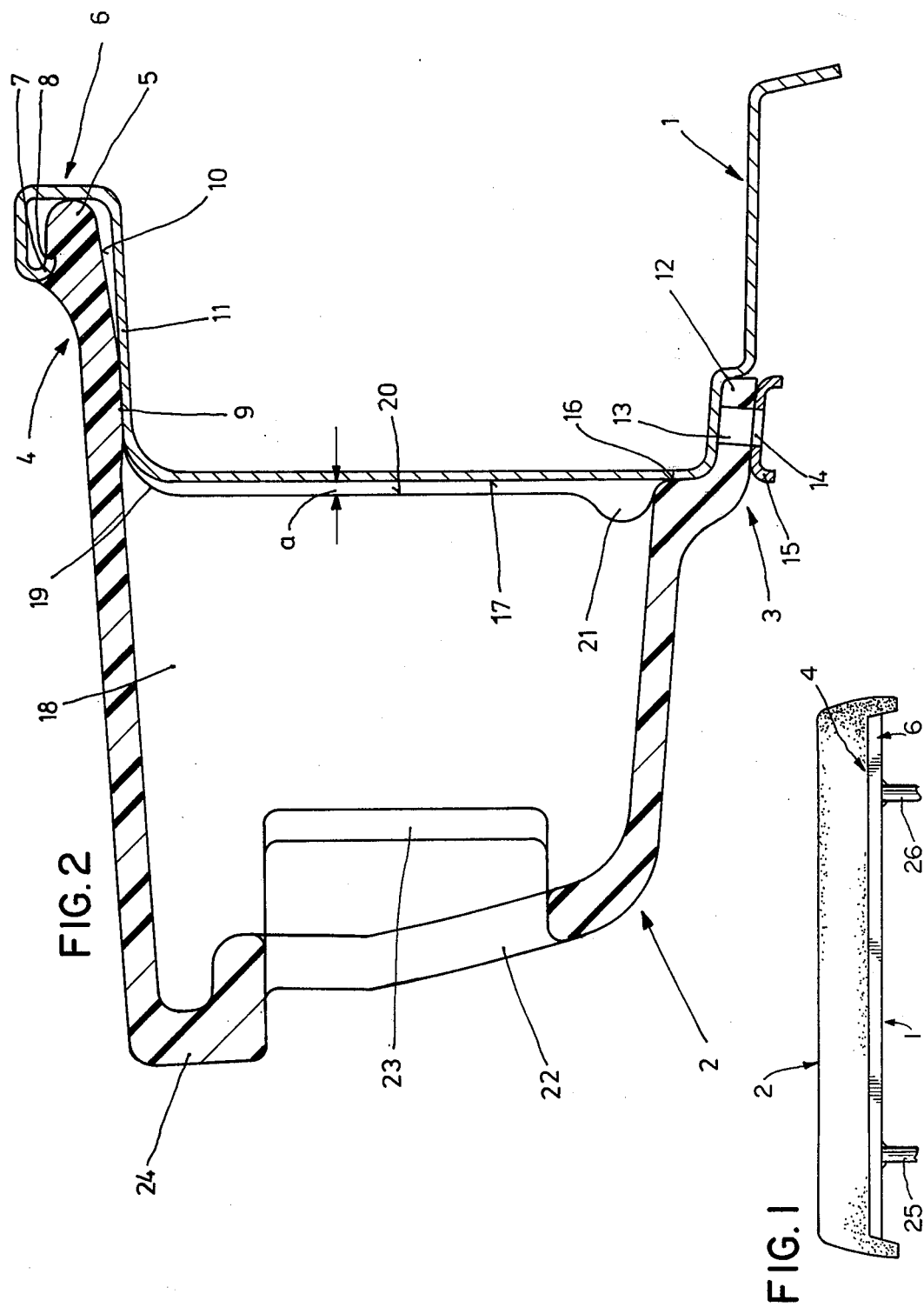

BUMPER ARRANGEMENT AND CONNECTION

BACKGROUND OF THE INVENTION

The present invention relates to bumpers and, more particularly, to bumpers comprised of a rigid rear support frame and a deformable front hollow section with freely extending parallel shanks for embracing the rigid frame.

Bumpers of this kind which may be used for vehicles and also for the protection of stationary objects, e.g. a bumping post arrangement, have become known through Offenlegungsschrift No. 2,360,525, 63c 70 and U.S. Pat. No. 3,638,985. The ends of the two free shank regions shown in these references are placed in hook-ledges that have an approximately hook-shaed cross section and are bolted to the rigid support. This arrangement requires not only an undesirable loss of time during assembly because of the screwing on and tightening of a large number of screws, but also suffers from the disadvantage that the screw bolts are subjected to shearing stress during an impact.

While a bumper construction as per Offenlegungsschrift No. 2,111,309, 63c 70 offers the advantage that both free shank zones of the hollow profile are joined with the rigid support means by hooking or buttoning into it, this is possible only in the case of a front hollow section made of comparatively soft material. Accordingly, this known bumper contains an intermediate layer consisting of a volume-elastic material in the space enclosed by the composite hollow section.

It is the purpose of the present invention to provide a bumper having a deformable hollow front section with free shank regions that embrace a rigid rear support frame, in which the assembly effort can be kept as small as possible without affecting the structural design with respect to the desired energy absorption. The attainment of this purpose in accordance with the invention is characterized in that only one of the free shank regions of the hollow section is connected with the rigid support means by screwed connections, while the other free shank zone is buttoned or hooked into a holding element of the rigid support means. This holding element has an approximately U-shaped cross section. Also, the screw-connected free shank region is provided with a support edge that bears on the front portion of the rigid support means in order to relieve shear stresses on the screw bolt.

Thus, in accordance with the invention only a first one of the free shank regions of the hollow section is maintained on the rigid support means by screwed connections. Also, in order for the screwed connections not to be stressed in a harmful manner during impacts, there is provided in front of the screwed connections a support for the hollow section by the front portion of the rigid support means. In contrast the connection between the other or second free shank region of the hollow profile and the rigid support means is designed as an interlaced or hooked connection. This design preferably provides for the holding element to be formed so as to (1) grip the end of the second free shank region only on the side facing away from the first one of the free shank regions, (2) provide a clearance between the other side of the end and the holding element in order to permit the interlacing and (3) force the second free shank area preceding the holding element to bear against the rigid support means. The bracing of the second free shank region on the rigid support means may be obtained by projections on the rigid support means and the second free shank region, respectively, which are directed towards each other. In one embodiment of the invention the inner surface of the second free shank region, that faces the rigid support means and extends behind the point where the rigid support means braces it, is inclined in cross section relative to the rigid support means.

However, whatever structural means is used for the bracing of the second shank region, it must form a kind of swival axis which makes it possible during assembly to initially introduce the second free shank region into the holding element by utilizing the clearance between the latter and the rigid support means. This must be accomplished without any obstruction by the hook-shaped form of the holding element. After the second free shank region is inserted, the hollow section is swivelled in cross section until the first free shank region assumes a position that permits the screwed connection to be accomplished. Since the hollow section is comprised of a material that is deformable by the impacts to be absorbed, but is not deformable by the forces occurring during assembly, the swivelling of the hollow section by necessity results in a swivelling of the end of the second free shank region, until the hook shape of the holding element grips its end from the rear. The swivelling motion terminates once the hook-like rear grip is accomplished and/or when a portion of the first free shank region bears against the front portion of the rigid support means.

Assembly is rendered easier if the second free shank region, which is hooked together with the holding element, is longer in cross section than the first free shank region. This embodiment of the invention offers the additional advantage that in the event of impact, the second free shank region, which is supported by the holding element, can curve outwardly along its portion from outside the holding element to the reinforcing ribs.

Tests have shown that during a collision, due to this outward arching of the second free shank region and also the curving of the portions of the hollow section adjacent to the free shank regions, the reinforcing ribs, which effect a stiffening of the bumper, are subjected to tensile stress. These tensile stresses are so great that in the region of the edges of the ribs adjacent the rigid support, the ribs are broken off from the outer portions of the hollow section. Rounding of the ribs in the transition zones between the reinforcing ribs and the front hollow section cannot prevent this. In accordance with the invention, however, a remedy for the problem can be achieved by spacing the front edges of the reinforcing ribs from the front portion of the rigid support means by a narrow gap, e.g., on the order of 2 mm, and assuring that the edges of the reinforcing ribs in the proximity of the support edge have rounded clearances. In one execution of the invention, each reinforcing rib is provided with a clearance, that has a depth of about 6 mm and is directly adjacent to the supporting edge, and a large radius cut, that passes into the remaining course of the reinforcing rib and into the support edge, respectively. Thereby, there is imparted to each of the reinforcing ribs a greater ability to expand in that region of the ribs that is especially subjected to tensile stress.

It has been found that the bumper in accordance with the invention can be used on automobiles without any deformation bodies arranged behind it. The rigid support means is then rigidly connected with the vehicle or is a component of the frame or the body of the vehicle itself.

BRIEF DESCRIPTION OF THE DRAWINGS

An example of an embodiment of an automobile bumper according to the invention is explained in detail with the help of the following drawings in which FIG. 1 is a diagrammatic plan view of a bumper and FIG. 2 illustrates a cross section thereof.

DESCRIPTION OF AN EXEMPLARY EMBODIMENT

As shown in FIG. 1 the main components of the bumper in accordance with the invention are a rigid support means 1, which may be, e.g. a component of the vehicle attached to a vehicle by bumper shanks 25 and 26, and a hollow section 2, comprised of some deformable material. The hollow section 2 has two free shank regions with the bottom shank region 3 in the assembled condition being shorter in cross section than the upper free shank region 4.

The upper free shank region 4 as shown in FIG. 2 projects with its end 5 into a holding element 6 of the rigid support means 1. The holding element has an approximately U-shaped cross section with a hook-shaped ledge 7 at one end. By means of this hook-shaped ledge the holding element is engaged in a recess 8 of the upper free shank region 4 so that in the assembled condition it grips the rear of end 5 of the upper free shank region 4.

Because of a surface 9 of the upper free shank region and the presence of a surface 10 that is somewhat inclined towards the outside near the end 5, the upper free shank region 4 is supported by a side portion 11 of the rigid support means 1 in such a way that it presses its end 5 in an upward direction which ensures the hook connection.

The bottom free shank region 3 projects into a recess 12 of the rigid support means 1 and is maintained there on the rigid support means 1 by screw bolts that pass through screw holes 13. A screw ledge 15, likewise, with screw passage holes 14, is provided and extends perpendicular to the drawing plane of FIG. 2 along the bumper.

An important characteristic of the construction of the bumper involves means for relieving the screwed connection of stresses that develop when impacts occur. To accomplish this the hollow section is designed so that a support edge 16 bears against a front portion 17 of the rigid support means 1. A stress relief means of this kind for the points of connection for the upper free shank region is not provided. Instead the hooked connection forms a force-absorbing brace for the upper free shank region 4 during an impact. The latter can therefore arch outwardly between the holding element 6, on the one hand, and the zone of reinforcing rib 18, on the other hand. Reinforcing ribs 18 for the structure are provided at desired intervals in the hollow section 2. They are produced integrally with the other regions of the hollow section and are provided at the foot of the upper free shank region 4 with a large radius curvature 19. In case of impact, the reinforcing rib 18 is subjected to great tensile stress, especially at its front edge 20 which faces the front portion 17 of the rigid support means across a small distance $a$. The gap $a$ is at least approximately constant in cross section. As tests have shown, there is a danger of tearing in the transition region between the rib 18 and the other regions of the hollow profile 2. In order to counteract this, there is provided not only the large transition radius at 19, but also the rounded clearance 21 in the rib front edge 20 immediately next to the support edge 16. It has been found that this clearance is effective to prevent tearing of the reinforcing rib 18 during an impact, even if the rib front edge 20 comes to bear upon the front portion 17 and a considerable deformation of the hollow section occurs. This is so because the clearance 21 provides a tensile stress dissipation zone.

As indicated at 22, the wall of the hollow section 2 may contain recesses to accommodate flashing lights which are supported on webs 23 that extend from the rib 18. Below nose 24 of hollow section 2, decorative moldings may be attached in a well known manner. The shaping of the front region of the hollow body 2 is determined largely be esthetic considerations.

Assembly of the bumper is accomplished by initially introducing the upper free shank region 4 with its end 5 into the holding element 6 while the hollow section 2 is kept inclined in cross section. Thereafter, the section is rotated counterclockwise and the surface 9 comes to bear against the side 11 of the rigid support means, thus establishing the hook connection between elements 7 and 8. At the same time the lower free shank region 3 is moved into a position in which the screw connections can be executed. Thereby the support edge 16 is automatically moved into its operating position against the rigid support means.

While the invention has been particularly shown and described with reference to a preferred embodiment thereof, it will be apparent to those skilled in the art that various changes in form an details may be made therein without departing from the spirit and scope of the invention.

We claim:

1. A bumper for an object to be protected, e.g., an automobile, with a closed profile-section support means comprised of a rigid rear support means and a front hollow section made of some deformable material, said hollow section partly embracing the rigid support means with two freely extending parallel shank regions of said hollow section and being connected in at least one of these regions with the rigid support means by screw bolts, said hollow section also containing reinforcing ribs with front edges arranged at a distance from, and opposite, a front portion of the rigid support means so as to form a small gap, characterized in that only a first one of the free shank regions of the hollow section is connected with the rigid support means by screw bolts, the hollow section at the beginning of the first free shank region is provided with a support edge that bears on the front portion of the rigid support means, and a second one of the free shank regions of the hollow section is hooked into a holding element of the rigid support means, said holding element having an approximately U-shaped cross section with an inwardly directed hook at its outer end, which hook is positioned so as to grip a recess in the end of the second free shank region towards the rear on the side facing away from the first shank region, a clearance adapted to permit the establishment of the hooked connection is provided between the other side of the end of the second free shank region and the holding element, and a surface of the second free shank region preceding the holding element bears against the rigid support means.

2. A bumper as in claim 1, characterized in that the inner surface of the second free shank region facing the rigid support means has an inclined cross section relative to the rigid support means towards its end and after the surface that bears against the rigid support means.

3. A bumper as in claim 1, characterized in that the second free shank region is longer in cross section than the first free shank region.

4. A bumper as in claim 1, characterized in that the gap between the reinforcing ribs and the rigid support means is at least approximately constant over the cross section, said ribs being provided with rounded clearances near the support edge of the hollow section.

* * * * *